UNITED STATES PATENT OFFICE.

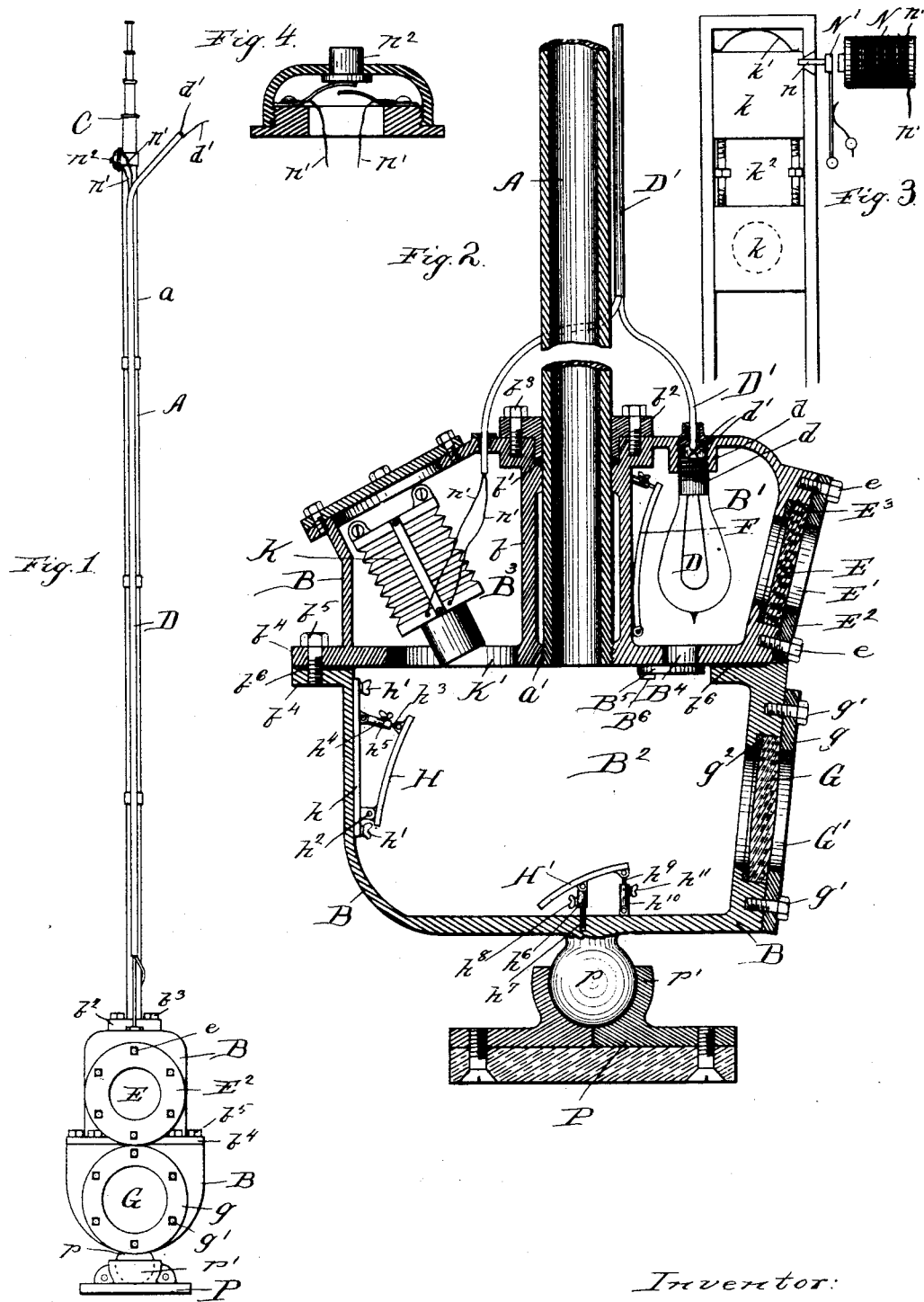

ANDREW L. DUTTON, OF RACINE, WISCONSIN, ASSIGNOR TO HIMSELF AND WALTER B. DUTTON, OF SAME PLACE, AND MARSHALL M. DUTTON, OF CHICAGO, ILLINOIS.

SUBMARINE SEARCH-LIGHT.

SPECIFICATION forming part of Letters Patent No. 404,390, dated June 4, 1889.

Application filed November 16, 1888. Serial No. 291,037. (No model.)

*To all whom it may concern:*

Be it known that I, ANDREW L. DUTTON, a citizen of the United States, residing at Racine, in the county of Racine and State of Wisconsin, have invented a new and useful Improvement in Submarine Search-Lights, of which the following is a specification.

My invention relates to submarine search-lights.

The object of my invention is to provide a search-light apparatus or device whereby objects under water may be illuminated by a light placed in proximity thereto under the water and observed from a point above the surface of the water, and whereby also photographs may be taken of such illuminated objects in or under the water.

My invention consists, essentially, of a shell or case adapted to be submerged under the water to any desired depth, containing an electric or other lamp for illuminating the submarine object to be observed, and provided with an observation-tube extending from the case to the surface of the water, the case being furnished with suitable lenses or windows for directing the light of the lamp upon the object and for reflecting the image thereof up through the observation-tube, in connection with a camera which is mounted within this submerged case or shell, for photographing the object or image thereof as it is reflected upon the mirror within the chamber of the shell.

My invention also consists in the novel devices and novel combinations of parts and devices herein shown and described, and more particularly pointed out in the claims.

In the accompanying drawings, which form a part of this specification, and in which similar letters of reference indicate like parts, Figure 1 is a side elevation of a device embodying my invention. Fig. 2 is a central vertical section. Fig. 3 is a detail view showing the mechanism for operating the shutter of the camera; and Fig. 4 is a detail view showing the key for closing the electric circuit at the upper end of the observation-tube in order to operate the shutter of the camera.

In the drawings, A represents the observation-tube, which is made in a series of screw-threaded sections, so that it may be extended to any desired length as the case or shell B is lowered into the water by simply attaching additional sections $a$ at the upper end of the tube. To the upper section $a$ of the tube is attached a telescope C, which may be of any suitable and well-known construction, through which the reflected image of the illuminated object may be observed. The lower section of the observation-tube A is attached to the hollow hub or sleeve $b$ of the case or shell B by screw-threads $a'$. The joint between the tube A and the hub $b$ is made water-tight by a suitable packing-ring $b'$ and clamp-ring $b^2$, which is secured to the hub $b$ by screws $b^3$. The case or shell B is made in two parts, the same having flanges $b^4$, which are securely united by screws or bolts $b^5$, the joint between the two flanges being made water-tight by a suitable packing-ring $b^6$. The case or shell B contains three separate chambers B', B$^2$, and B$^3$—one for the electric lamp D or other light, one for the reflectors or lenses, and one for the camera. The light-chamber B' is furnished with a lens, glass plate, or window E, through which the light from the lamp D may be cast upon the submarine object. The light-chamber B' is also furnished with a reflector F for directing the light of the lamp more effectively upon the object in front of the lens E. The lens E is secured in the opening E' by a clamp-ring E$^2$, the joint being made water-tight by the packing-ring E$^3$.

The clamp-ring E$^2$ is secured by threaded bolts $e$. The lamp D is preferably an incandescent electric lamp. Other kinds of lamps may, however, be used. The lamp is attached inside the chamber B' to a screw-threaded boss $d$. The electric-circuit wires $d'$ $d'$ extend up through the small supplemental tube D', which is attached to the observation-tube A. The lens E may be mounted adjustably, if desired, so that it may be turned to throw the light in different directions. This, however, ordinarily will not be required, as the lamp D is located very close to the lens or window E, so that the light will be thrown upon quite a large field.

The reflector-chamber B$^2$ in the shell B is furnished with a lens G, secured in an opening G' by means of a clamp $g$, screws $g'$, and packing-ring $g^2$, so as to form a watertight connection. The reflector-chamber $B^2$ is provided with one or more—preferably two—reflector-lenses H H', so constructed and arranged that the image of the object is reflected up the observation-tube A. These reflectors H H' may be of any suitable form or construction, and may be mounted and secured in any suitable manner within the chamber $B^2$. The reflector H, which is placed opposite the lens G, is preferably concave, and it is mounted upon an adjustable slide $h$, attached to the wall of the chamber $B^2$ by thumb-screws $h'$, so that it may be adjusted up or down. The inclination of the reflector H may be adjusted on the slide $h$, as the reflector H is pivoted near one end, at $h^2$, to said slide, and at the opposite end it is furnished with a pivoted pin $h^3$, which slides in a sleeve $h^4$, pivoted to the slide $h$. The pivoted pin is secured in the sleeve by a set-screw $h^5$. The reflector H' is mounted opposite the observation-tube A, so that the image thereon may be seen through said tube. The reflector H' is also mounted adjustably, being pivoted to a sliding sleeve $h^6$, which is adjustably secured on a pin $h^7$ by a set-screw $h^8$. To more securely fix the reflector in place, it is furnished with a pivoted pin $h^9$, which slides in a pivoted sleeve $h^{10}$. A set-screw $h^{11}$ secures the pin $h^9$ in place in the sleeve $h^{10}$.

The camera K, which may be of any well-known construction, is secured to the shell B within the camera-chamber $B^3$, and is directed and properly focused upon the reflector H'. The camera-chamber $B^3$ has an opening K', through which the lens-tube of the camera may project. Before the camera is placed in the lens-chamber $B^3$ it is adjusted to properly focus upon the reflector H'.

$k$ represents the ordinary sliding shutter with which the camera is provided, and $k'$ is the spring for actuating the same. This shutter has an adjustable opening $k^2$, so that a greater or less exposure may be given as the shutter moves.

N is an electro-magnet having an armature N', to which the shutter-releasing catch or pin $n$ is secured. When the magnet N is energized by a current flowing through the circuit-wires $n'$ $n'$, the shutter is released and the image of the object upon the reflector H' will be photographed by the camera. The circuit-wires $n'$ $n'$ extend up alongside the observation-tube A, and preferably through the same tube D' which carries the electric-light wires $d'$ $d'$.

The shell B is provided with a base-plate P, which is connected to the shell or case B by a ball-and-socket joint $p$ $p'$, so that the shell B may be turned on its axis, and so that it may be tilted from side to side, as may be required, to direct the lenses E G upon any object desired. The electric circuit $n'$ $n'$, which is used to operate the shutter of the camera, is closed by a key $n^2$, secured to the tube A near the top thereof.

The light-chamber B' is provided with a window or opening $B^4$ to let additional light into the reflector-chamber $B^2$ when desired. This opening may be closed or partially closed, as required, by a shutter or slide $B^5$, which turns upon a pivot $B^6$.

The case B may be made of any suitable material; but it is preferably made of cast-iron. If the case B is furnished with other than an electric lamp, a suitable draft tube or chimney will be substituted for the tube which carries the electric wires. In this case the fresh air may be admitted down through an additional tube attached to the observation-tube.

In operation the device may be used from a boat, wharf, or other convenient point above the surface of the water.

I claim—

1. The combination, with the shell or case B, of an observation-tube A, attached thereto, a lamp contained within said case for illuminating the object, lenses or reflectors, and a camera contained within said case or shell adjacent to said observation-tube, substantially as specified.

2. The combination, with the tube A, of shell or case B, having light-chamber B' and reflector-chamber $B^2$, electric lamp D, lens or window E, lens or window G, and two reflectors within said chamber $B^2$, one opposite said lens G and one opposite said observation-tube A, substantially as specified.

3. The combination, with the tube A, of shell or case B, having light-chamber B' and reflector-chamber $B^2$, electric lamp D, lens or window E, lens or window G, and two reflectors within said chamber $B^2$, one opposite said lens G and one opposite said observation-tube A, and camera K, contained within said case or shell adjacent to said observation-tubes, substantially as specified.

4. The combination, with the tube A, of shell or case B, having light-chamber B' and reflector-chamber $B^2$, electric lamp D, lens or window E, lens or window G, and two reflectors within said chamber $B^2$, one opposite said lens G and one opposite said observation-tube A, camera K, and an electric circuit and magnet for operating the shutter of said camera, substantially as specified.

5. The combination, with tube A, of shell or case B, having light-chamber B' and reflector-chamber $B^2$, electric lamp D, lens or window E, lens or window G, and two reflectors within said chamber $B^2$, one opposite said lens G and one opposite said observation-tube A, said reflectors being hung adjustably within said chamber, substantially as specified.

6. The combination, with shell or case B, of an observation-tube A, attached thereto, a lamp contained within said case for illuminating the object, and lenses or reflectors, said case being provided with a base P, connected thereto by a ball-and-socket joint, substantially as specified.

7. The combination of observation-tube A, case B, having windows or lenses E G, lamp D, and base-plate P, said shell B, with its tube A, being rotatable on said base-plate, substantially as specified.

8. The combination, with the tube A, of shell or case B, having light-chamber B' and reflector-chamber B², electric lamp D, lens or window E, lens or window G, and two reflectors within said chamber B², one opposite said lens G and one opposite said observation-tube A, and a telescope at the upper end of said observation-tube, substantially as specified.

ANDREW L. DUTTON.

Witnesses:
BYRON SUTHERLAND,
BYRON B. NORTHROP.